United States Patent [19]
White

[11] Patent Number: 5,273,432
[45] Date of Patent: Dec. 28, 1993

[54] HINGED LAMINATED MAP AND METHOD FOR MAKING

[76] Inventor: David White, P.O. Box 25, Lompoc, Calif. 93436

[21] Appl. No.: 51,535

[22] Filed: Apr. 23, 1993

[51] Int. Cl.$^5$ .................. G09B 29/04; B42D 15/04
[52] U.S. Cl. .................................. 434/150; 283/34; 283/105; 281/2; 281/5
[58] Field of Search ............... 434/150; 283/34, 105; 281/2, 5

[56] References Cited

U.S. PATENT DOCUMENTS

| | | | |
|---|---|---|---|
| 1,378,063 | 5/1921 | Swick | 281/2 |
| 4,540,612 | 9/1985 | Rhyner | 281/2 X |
| 4,673,197 | 6/1987 | Shtipelman et al. | 434/150 X |
| 4,796,920 | 1/1989 | Landry et al. | 434/150 X |
| 5,207,457 | 5/1993 | Haynes | 283/34 |

FOREIGN PATENT DOCUMENTS

| | | | |
|---|---|---|---|
| 62198 | 10/1982 | European Pat. Off. | 434/150 |
| 148597 | 7/1985 | European Pat. Off. | 283/105 |
| 212405 | 3/1987 | European Pat. Off. | 434/150 |
| 329861 | 8/1987 | European Pat. Off. | 434/150 |
| 3115109 | 2/1982 | Fed. Rep. of Germany | 434/150 |
| 718540 | 11/1954 | United Kingdom | 434/150 |

*Primary Examiner*—Gene Mancene
*Assistant Examiner*—L. Thomas
*Attorney, Agent, or Firm*—Michael G. Petit

[57] ABSTRACT

A folding laminated map with an improved hinge and image retention is described. The map, or composite image, is separated into two or more discrete partial images or panels and printed on a single sheet of a suitable material. The discrete panels contain all the graphic information contained in the composite image, but the panels are spaced from adjacent panels in the composite image. The space between panels is a blank area on the printed sheet which will become the hinge. Slot-like portions are cut out of the blank area on the printed sheet in such a way as to leave connecting tabs between adjacent partial images or panels. The slots are very narrow enabling substantial juxtaposition of adjacent panels. After the slots are cut out of the hinge portion of the printed sheet, the single sheet containing the panels is passed through a laminating device with the hinge parallel to the direction of travel through the laminator. Because the slot is so narrow, the sheets of laminating film on the top and bottom trap air within the slot(s). The narrowness of the slot(s) together with the direction of travel of the sheet through the laminator prevent the top and bottom layers of laminating film from contacting each other in the hinge area. The trapped air acts as a compressible section reducing friction and reducing wear and extending the durability of the map.

2 Claims, 4 Drawing Sheets

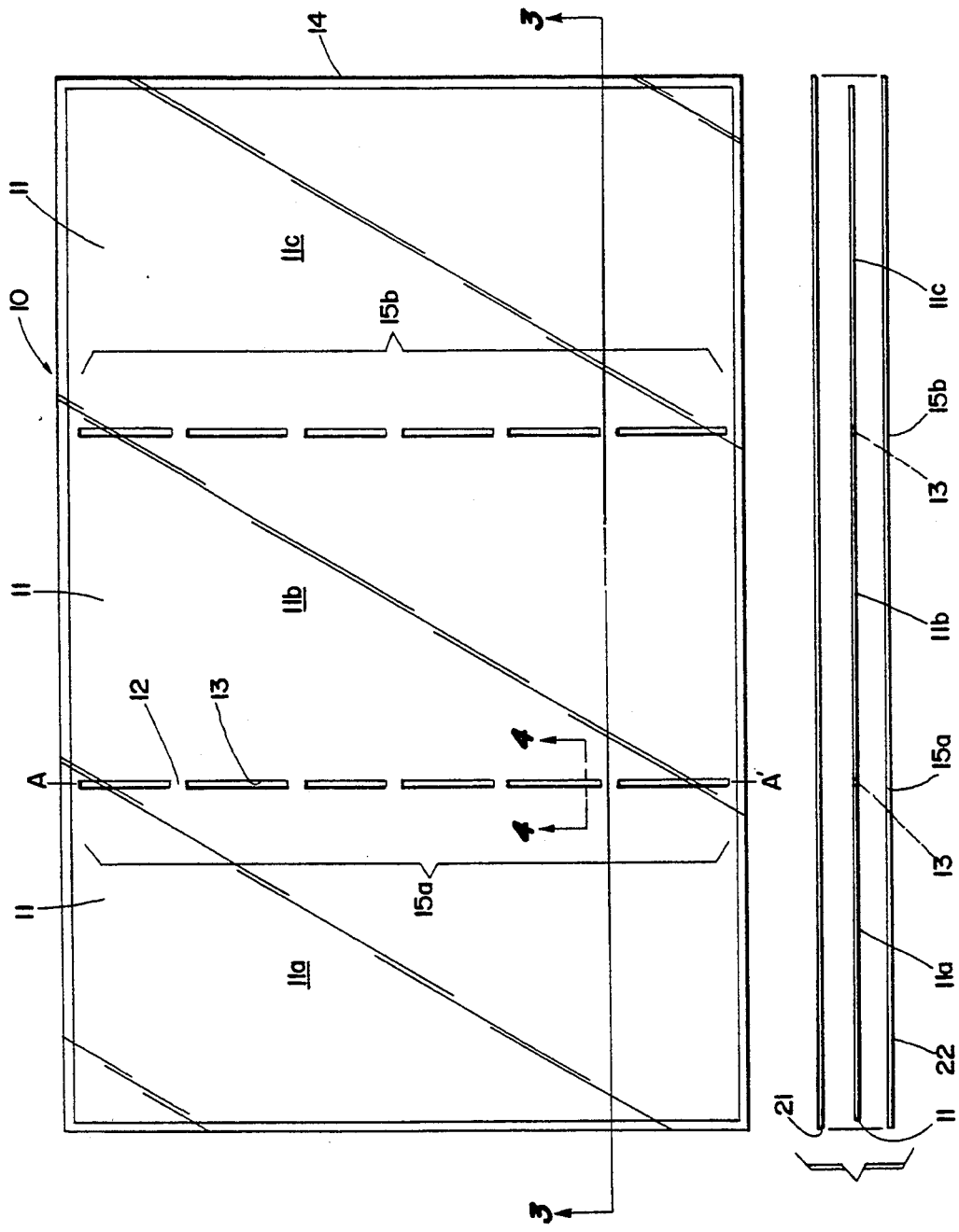

5,273,432

HINGED LAMINATED MAP AND METHOD FOR MAKING

BACKGROUND OF THE INVENTION

1. Field of the Invention

This invention relates to a folding laminated graphic image and a method for making, and more particularly to a folding laminated map.

2. Prior Art

Folding maps are well known in the art. It is also well know that repeated use of folding maps renders the folds weakened the folds shortly disintegrate, particularly at the corners. Attempts to cover or encase maps in plastic create a variety of problems, many of which have been described and addressed by other. Representative of such teaching are U.S. Pat. Nos. 3,206,225; 4,360,346; 3,257,126; 4,636,065 and 3,615,035.

To overcome some of the residual problems with current folded maps, Howard, Jr., et al., in U.S. Pat. No. 5,063,637, (issued Nov. 12, 1991 and incorporated herein by reference), discloses a laminated article having two or more leaves with an improved hinge therebetween. Howard, Jr. et al., discuss the advantages and disadvantages of prior art methods of creating folds in visual materials. According to Howard, Jr., et al., when material can be presented side-by-side as two discreet elements and not part of a continuum, the leaves or pages (panels) can be printed side-by-side on a single sheet of paper. The sheet of paper can then be laminated by conventional means with relatively thin laminating film (usually a polypropylene/mylar film of approximately 0.008 cm or less), and subsequently folded in half to create a crude hinge apparatus. Sometimes the paper is scored during the printing process prior to lamination to facilitate folding.

The advantage of this process, according to Howard, Jr., et al., is that it is easy to accomplish. There are many disadvantages however to this method. First and foremost because the hinge comprises the same material as the panels, the hinge exhibits a significant bending resistance. Hinges of this type of construction have the disadvantage that the leaves or panels are very limited in their ability to fold one upon the other. Furthermore, because of the extent of bending resistance relative to the weight of the panels, the hinge exhibits memory. Memory is defined as the tendency of the hinge to cause the panels to return to a prior position following manipulation to a new position. Memory is most commonly observed when a map is opened flat on a table; the map resists the planar configuration and has tendency to revert to the closed position.

Most commonly prior art hinged maps comprise two or more panels having a thickness which are spaced apart so as to form one or more gaps therebetween having a width and wherein a bottom sheet of laminating film having a thickness contacts one side of the panels, and a top sheet of laminating film having a thickness contacts the other side of the panels. In such constructions the top sheet of laminating film contacts the bottom sheet of laminating film at the gaps to form one or more "webs" having a bending resistance. Of particular importance in the construction of prior art maps as described by Howard, Jr., et al., the top sheet of laminating film and the bottom sheet of laminating film contact each other at the gap. In order to do this, the gap is necessarily wide to permit the rollers in the laminating machine to force the two sheets of laminating film against one another. If the gap is too small, the sheets will not contact each other. This requirement results in a relatively large gap between adjacent panels and renders the continuity of the map difficult to follow with the eye as one jumps from one panel to the next. Moreover, when the gap is cut to form the hinge, as, for example by a die, information is lost from the map.

In view of the foregoing, it is desirable to provide a hinge for a laminated article wherein the hinge-forming gaps between the panels are narrower, thereby presenting a more continuous user-friendly image. It is also desirable to print the map in such a way that information is not lost from the map when the hinge gaps are cut.

SUMMARY OF THE INVENTION

It is an object of this invention to provide a unitary sheet bearing a graphic image which may be folded.

It is another object of this invention to provide a laminated map which presents a composite image as a folding array of partial images or panels, wherein each panel is in logical spacial registration with respect to the composite image.

It is still another object of this invention to provide a folding map having hinge gaps wherein all the map information is retained when the hinge gaps are cut.

It is yet another object of this invention to provide an improved hinging system for laminating articles which permits the use of thin laminating film.

It is still another object of this invention to provide a flat laminated article which may be repeatedly folded and unfolded without exhibiting "memory" or undue loss of integrity at the fold.

It is still another object of this invention to provide a method for making a hinged laminated map having narrow hinge gaps or slots to promote visual continuity across the hinge gaps.

These and other objects of the invention will soon become apparent as we turn now to the preferred embodiments of the invention.

BRIEF DESCRIPTION OF THE DRAWINGS

FIG. 1 is a top view of the preferred embodiment of the preferred invention.

FIG. 2 is a side view of the invention shown in FIG. 1 showing the arrangement of parts prior to lamination.

FIG. 5($b$) shows the same true image as in 5($a$) except that the map image has been printed as a composite image with a blank space where the hinge gap or slot will be cut between panels.

DESCRIPTION OF THE PREFERRED EMBODIMENT

Figure 3:
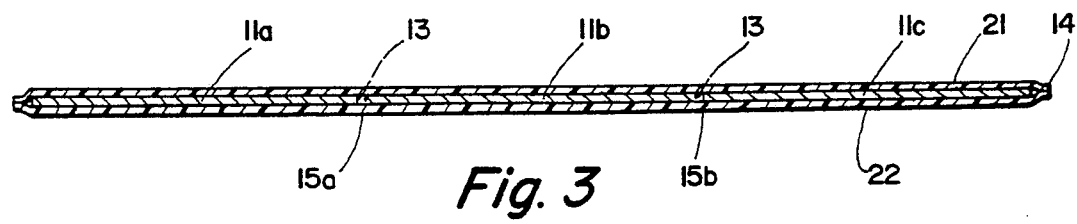
FIG. 3 is a side view, as in FIG. 2, following lamination.

Street maps normally comprise a fan folded sheet of paper on which is printed various visual indicia including streets and street names. Fan folded maps have the advantage that they may be conveniently stored in the glove compartment or visor of a car for easy access. The disadvantage is, of course, that repeated folding and unfolding causes wear at the folds with eventual disintegration of the map as described earlier. Accordingly, the present invention provides a hinged, foldable map that folds flat and has fairly stiff sheets and resists degradation at the hinge. The laminated surface permits the user to write upon the map and subsequently erase the markings.

DEFINITIONS

As used herein, the term "composite image" refers to visual information that has been printed onto a suitable substrate.

As used herein, the term "partial image" or, in the alternative, "panel" refers to a discrete portion of the composite image which is physically separated from other such panels comprising the composite image during the printing of the composite image.

FIG. 1 shows a folding map generally indicated at 10 comprising a single sheet of paper 11 which bears a composite image that has been divided into partial images 11A, 11B and 11C. The partial images 11A, 11B, 11C, hereinafter alternatively referred to as "panels", are portions of the composite image which during printing have been physically separated one from the other by a distance defining the hinge width. The hinge, located between A and A', and generally indicated at 15a and 15b, comprises two layers of laminating film sandwiching bridges or connecting tabs of material 2 linking panels. The hinge portions 15a and 15b comprise tabs 12 alternating with slots 13 in the sheet 11. Slots 13 are interspersed between the tabs 2 to provide less resistance to the hinge when the article 10 is folded. The slots 13 comprise the major portion of the hinge AA'. The tabs 12 serve primarily to keep adjacent partial images in alignment during the lamination procedure and to resist torque after the article is laminated. A border 14 surrounds the image-bearing sheet 11 where the laminating film overlaps the edges of the sheet 11 and is pressed together rendering the article impervious to water and the like.

Referring now to FIG. 2, a side view of the article of FIG. 1 is shown prior to laminating. The unitary, image-bearing sheet 11 with slots 13 cut therein is sandwiched between laminating films 21 and 22. The portions of the laminating sheet that will become the hinge AA' are indicated at 15a and 15b in FIG. 2.

Figure 4:
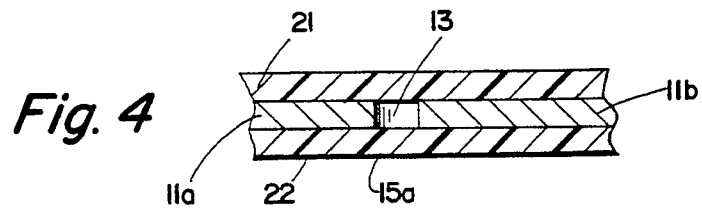
FIG. 4 is a partial fragmentary exploded end view of the hinge A—A' of FIG. 1 taken along section line 4—4.

An end view of the laminated article after lamination is shown in FIG. 3. The top sheet of laminating film 21 and the bottom sheet of laminating film 22 contact each other only at the border 14. The gap at 13 (FIG. 1) is filled with air. This is shown more clearly by looking at a fragmentary expanded view of the hinge along section line 4—4 of FIG. 1 as shown in FIG. 4. The adjacent panels 11A and 11B have a small gap therebetween denoted by 13. The gaps 13 are cut into the image-bearing sheet 11 coextensively with the blank space between adjacent panels. The size of the gap is sufficiently small that laminating films 21 and 22 when laminated vertically, that is, when the axis of the laminating roller is perpendicular to the direction of AA', does not press the film into the gap 13. The air space serves as a compressible element in the hinge even when the gap is narrow. Keeping the gap narrow also has the additional advantage of keeping the adjacent panels bearing partial images 11A and 11B as close together as possible so that the eye, tracing along a contour of the composite image is not disrupted unduly as a passage from panel 11A to panel 11B.

Another feature of this invention is that the composite image, instead of being printed in a continuum and then cut along the hinge to generate a gap thereby removing some of the image, the composite image is printed as an array of panels with no information printed int he hinge portion. Thus, none of the composite image is lost when the slots 13 are cut. That is, the slots 13 are cut only from blank stock and the slots do not intersect the composite itself. Thus, information such as roads or indicia running in a direction parallel to a hinge that would underlie the hinge still appear on the composite image when the composite image is printed as partial image separated by the hinge space.

EXAMPLE

Figure 5A:
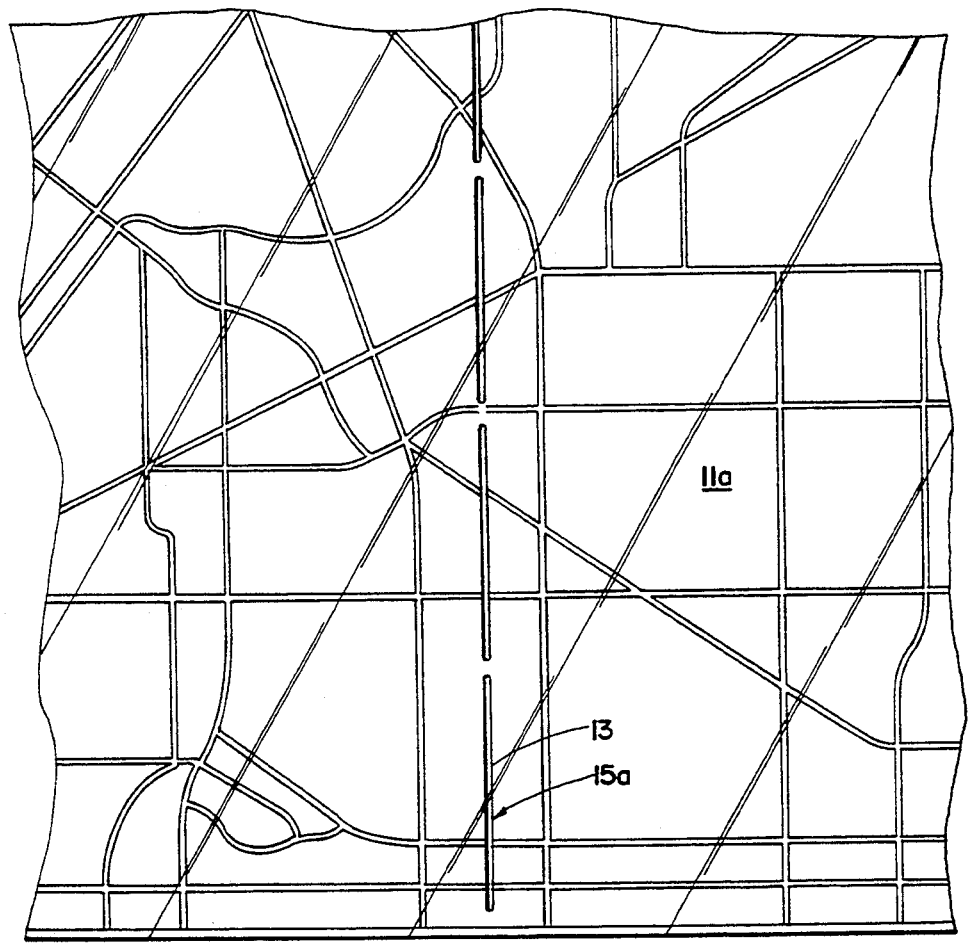
FIG. 5($a$) shows a sheet bearing an image of a map with a hinge gap or slot cut out between panels.
Figure 5B:
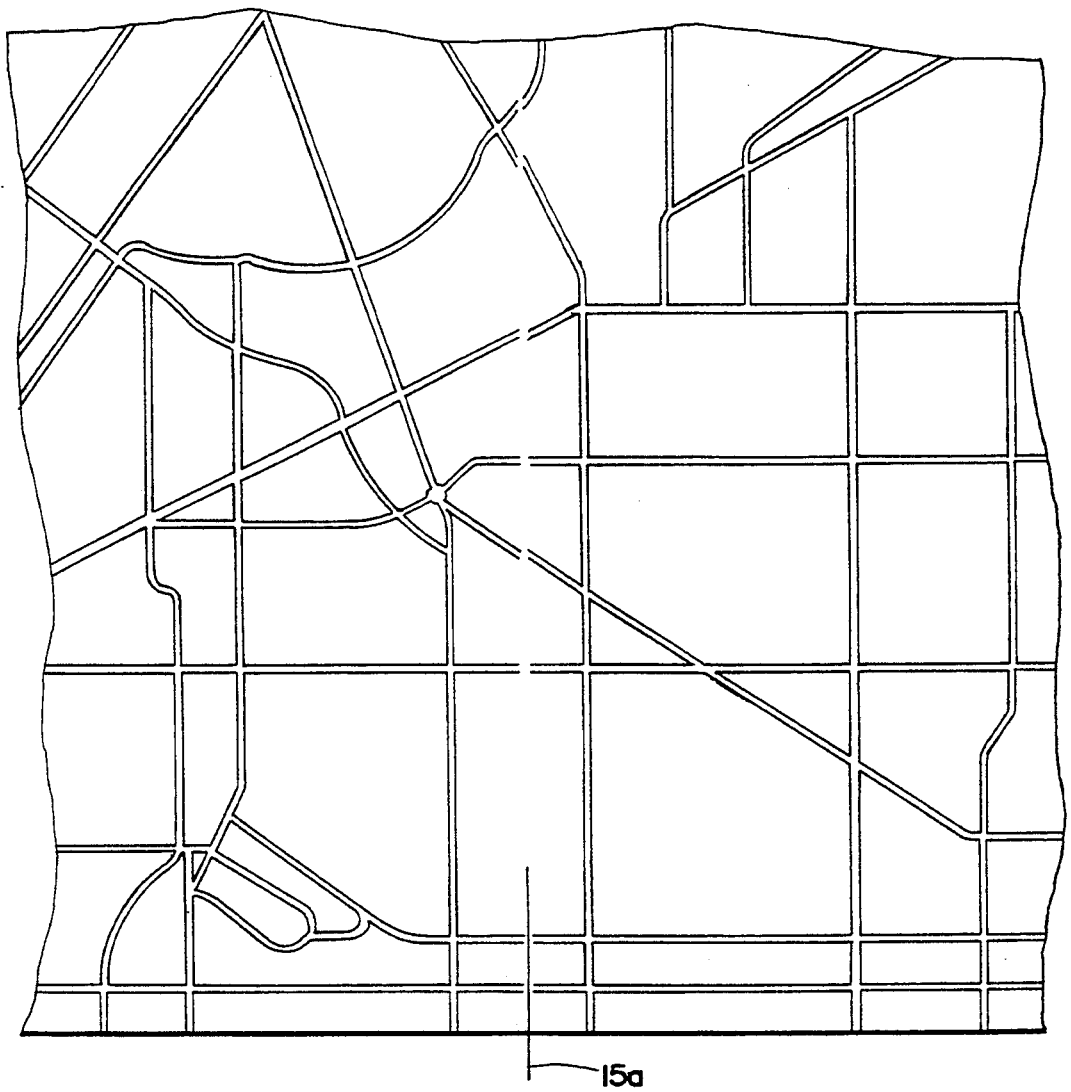

Separating Map Data into Panels without Losing Data at Folds:

The Composite Image is originally created by using a United States Geological Survey (USGS) sheet of the area to be mapped. USGS surveys are considered public domain and can, therefore, be traced, copied, or reproduced without copyright infringement. The USGS map is separated into adjacent regions as shown in FIG. 5(a) showing a portion of the California coastline near Santa Barbara. Then each region is scanned digitally into its respective discrete partial image (or panel). Each discrete partial image is then traced, highlighted, modified, colorized and enhanced as a sole and separate computer file. Once all the discrete partial images are completed the files are then exported into a new file, lined up with one another, spaced a gapwidth apart (approximately 1 mm) and stored as a single composite image. This process yields a product which, less its gaps, is a complete, uncut map of the area with preserved continuity. There are no portions of cartography punched out of the folds when the printed map is die cut. The gapwidth can be adjusted based upon the thickness of paper the map will be printed upon and/or the thickness of the laminate the map will be coated with. The objective is to maintain the narrowest gapwidth possible, as a function of paper and laminate thickness and the ability of the laminating film to stretch, in order to maximize the continuity of the composite image and effectively eliminate cartographic losses due to die cutting at the folds.

Formula for Defining Minimum Gapwidth

If we define certain of the variables as follows:

$T_P$ = Paper Thickness
$T_L$ = Laminate Thickness
$G_M$ = Minimum Gapwidth
$G_B$ = Base Gapwidth
    = $2 * T_P$
and
$K_L$ = Laminate Stretch Coefficient; then
    when K = 1    Stretch 0% (rigid)
    when K = 2    Stretch = 100% (length doubles)
    when K = 1.5  Stretch = 50% (length increases -continued to 150% of original length)

*stretch coefficient of 1.5 mil laminate ≈ 1.05

Then it can be shown that the minimum gapwidth is given by $$G_M = [(2)(T_p) + (4)(T_L)] - (G_B)(K_L - 1) \quad (1)$$

For example, on the Frogmap of Santa Barbara from which the Composite Image (FIG. 5(a)) was derived:
$T_p = 12/1000$ inch (12 pt)
$T_L = 1.5/1000$ inch (1.5 mil)
$G_M = ?$
$G_B = 24/1000$ inch
$K_L = 1.05$
Solving equation (1) for $G_M$:

$$G_M = [(2)(12/1000) + (4)(1.5/1000)] - (24/1000)(1.05 - 1) \quad (2)$$

$G_M = (24/1000 + 6/1000) - 1.2/1000$
$G_M = 28.8/1000$ inch $= 0.0288$ inch $$\boxed{G_m = .72 \text{ mm}}$$

The Laminating Process

Figure 6:
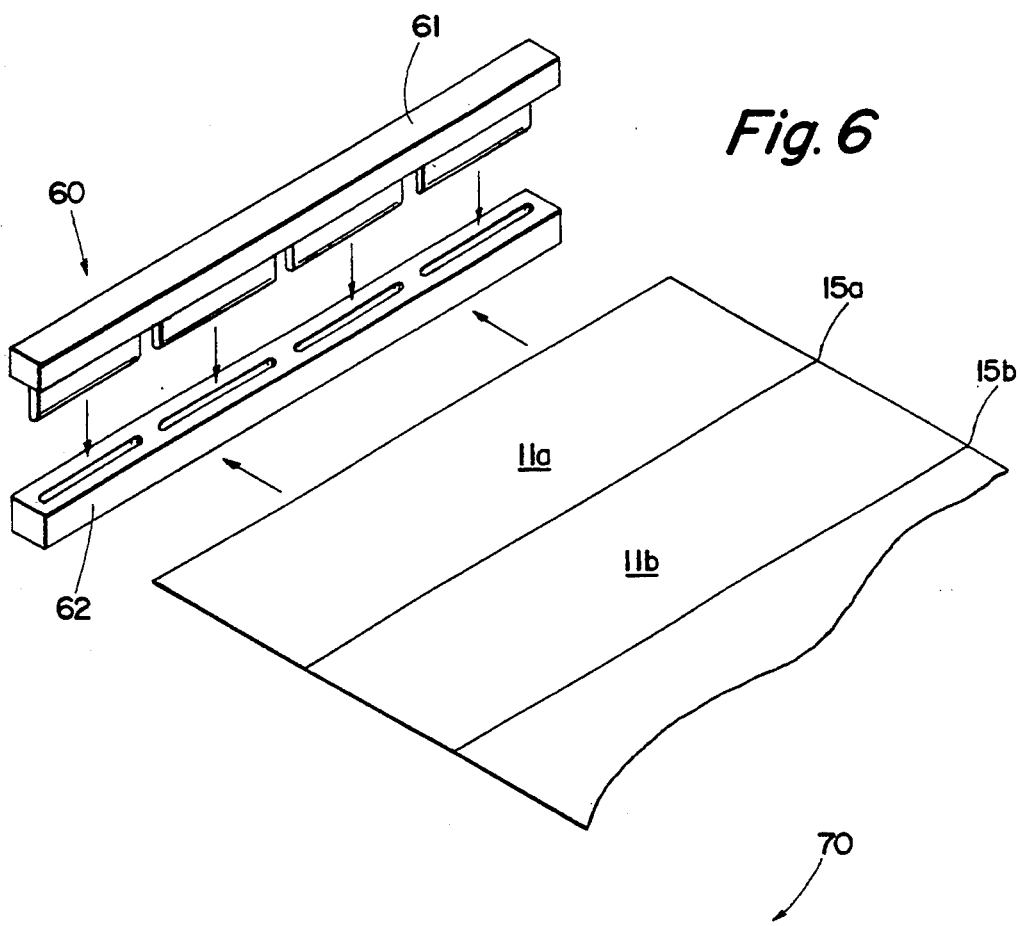
FIG. 6 is a schematic view of a die used for cutting slots in the blank area of the composite image that will become the hinge.

Once the composite images are printed and cut into single units they are then sent through a die cutting machine similar to that shown at 60 in FIG. 6. The die cutting machine is designed to punch the long, narrow gaps out of the folds in the composite image. The die cutting machine is a modified 16-gauge sheet metal shear fitted with a precision machined punch 61, and a precision machined die 62. Once the hinge gaps in the composite image are die cut at each fold, the sheet bearing the composite image can be sent through the laminator.

Figure 7:
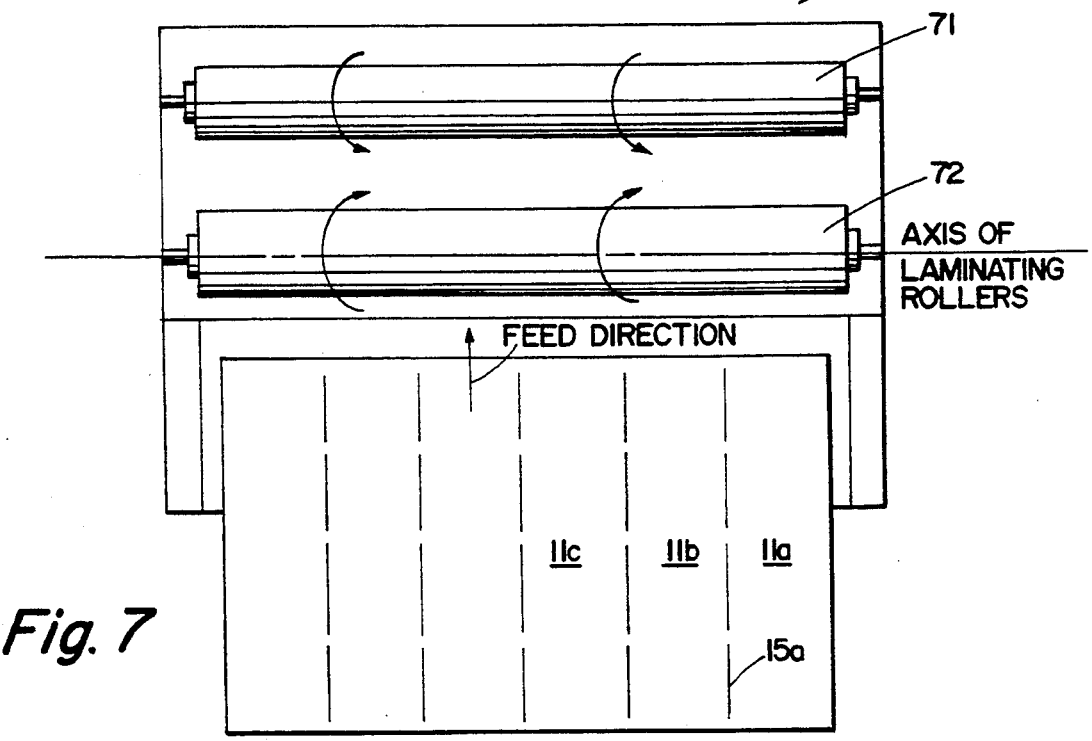
FIG. 7 is a schematic diagram of the sheet containing the composite image feeding into a laminator and shows the orientation of the hinge with respect to the laminator rollers.

As shown in FIG. 7, the sheet bearing the composite image is sent through a laminator 70 having laminating rollers 71 and 72 with the sheet's folds or hinges 15 perpendicular to the axis of the laminating rollers. This effectively minimizes the laminating rollers' ability to push the laminating film down into the gaps and fuse the top layer of laminate with the bottom layer. A friction-free pocket of entrapped air results. Any requirement to fuse the top layer of the laminate with the bottom layer would preclude the ability to manufacture the composite image with the minimum gapwidth. As stated above, the minimum gapwidth equals (2×paper thickness)+(4×laminate thickness)−(laminates ability to stretch). Example: If the composite image is printed on 12 point paper (12/1000 inch thickness) the minimum gapwidth would equal 24/1000 inch less the ability of the laminate to stretch. The ability of the laminate to stretch is generally found by trial and error, however, is never less than zero. Hence, assuming no requirement for fusing the top layer of laminate to the bottom layer, and that minimizing gapwidth is an advantage or improvement to the composite image, the gapwidth should be no greater than 0.69 millimeter in this example (or more generally, no greater than (2 * paper thickness)+(4 * laminate thickness).

Although in the preferred embodiment the hinge gap between panels is cut prior to lamination, it is understood that the gaps comprising the hinges may be cut after lamination as well as before. A feature of the invention is that the map or image is printed with a space between panels which space contains no cartographic information. Removal of this space to form a hinge removes no essential information from the map and serves only to facilitate folding along the hinge. This is true even if the hinge gap is cut subsequent to lamination.

The objects of the present invention having thus been described, the scope of the invention should not be limited to the particular embodiments, which are exemplary, but in accordance with the scope of the following claims.

What I claim is:

1. A laminated article comprising a single unitary sheet having a composite image thereon, wherein said composite image comprises at least two discrete partial images, said partial images being adjacent to each other and separated from each other by a hinge, said hinge comprising:
    (a) at least one perforation in said single unitary sheet, said perforation having a width which is substantially equal to the separation distance of said partial images;
    (b) a bottom sheet of laminating film contacting one side of said single unitary sheet; and
    (c) a top sheet of laminating film contacting the other side of said single unitary sheet;
wherein said top and bottom sheets of laminating film span at least one perforation and do not contact each other across said perforation.

2. A method of making a laminated folding map containing cartographic information comprising the steps of:
    (a) printing said cartographic information on a single sheet of printable stock wherein said cartographic information is divided into at least two discrete panels having a blank gap therebetween;
    (b) removing at least a portion of said blank gap from said single sheet to form a hinge between said panels, said hinge having a hinge direction; and
    (c) passing said single sheet through a laminator with the hinge direction perpendicular to the direction of the laminator roller axis.

* * * * *

UNITED STATES PATENT AND TRADEMARK OFFICE
CERTIFICATE OF CORRECTION

PATENT NO. : 5,273,432
DATED : Dec. 28, 1993
INVENTOR(S) : David White

It is certified that error appears in the above-indentified patent and that said Letters Patent is hereby corrected as shown below:

On the title page, item [56] References Cited, insert the following:

```
--3,206,225   9/1995  Oleson  ..................  281/29
  4,360,346  11/1982  Ehsanipour  .............  434/153
  3,257,128   6/1966  Schneider  ..............  281/39
  4,636,065   1/1987  Kanemitsu  ..............  355/75
  3,615,035  10/1971  Newton  .................  220/31
  5,063,637  11/1991  Howard, Jr. et. al.  ....  16/225--
```

Signed and Sealed this

Twenty-third Day of November, 1999

Attest:

Q. TODD DICKINSON

*Attesting Officer*   Acting Commissioner of Patents and Trademarks